E. A. PALMER.
SHEARING MACHINE.
APPLICATION FILED OCT. 29, 1913.
1,112,648.
Patented Oct. 6, 1914.
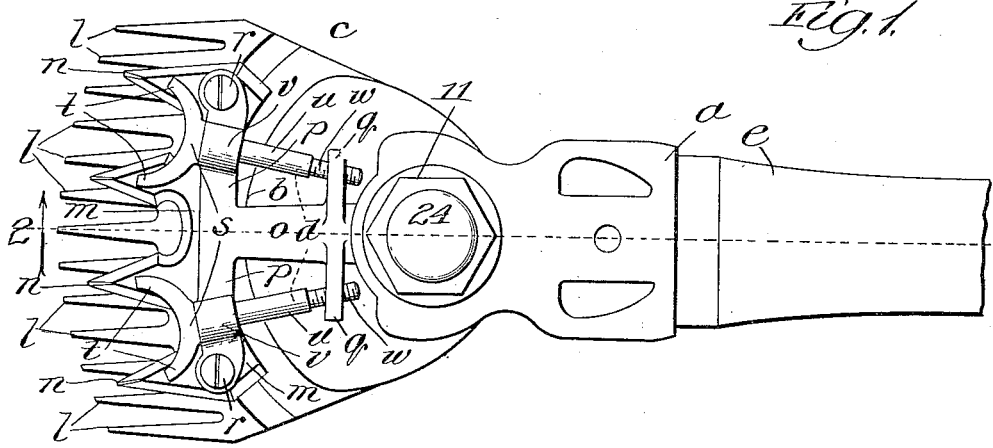
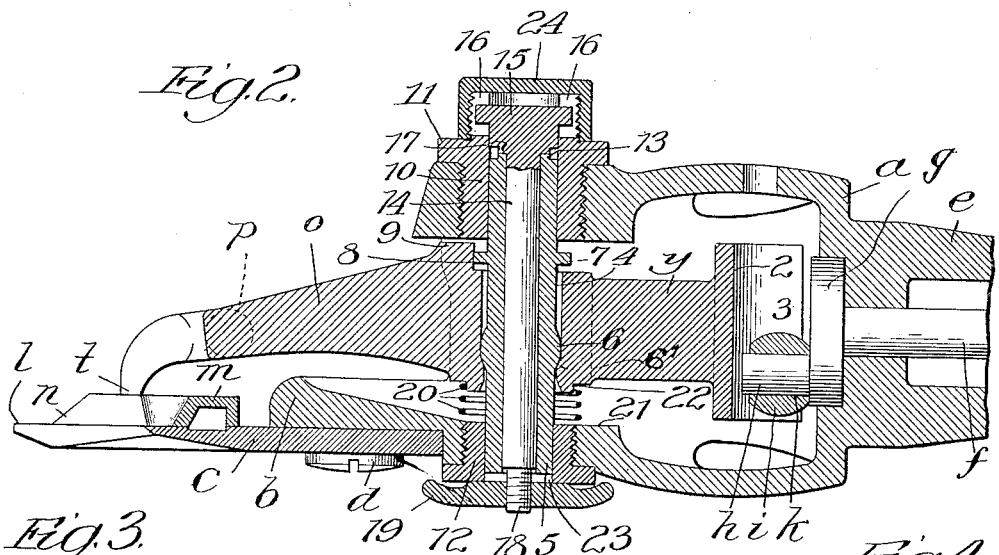
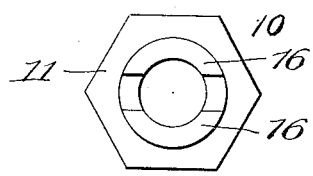
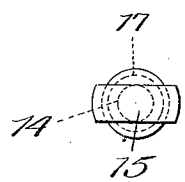
Witnesses:
Inventor,
Enoch A. Palmer
By Poole & Cromer
Attys.

UNITED STATES PATENT OFFICE.

ENOCH A. PALMER, OF AURORA, ILLINOIS.

SHEARING-MACHINE.

1,112,648.    Specification of Letters Patent.    Patented Oct. 6, 1914.

Application filed October 29, 1913. Serial No. 798,012.

*To all whom it may concern:*

Be it known that I, ENOCH A. PALMER, a citizen of the United States, and a resident of Aurora, in the county of Kane and State of Illinois, have invented certain new and useful Improvements in Shearing-Machines; and I do hereby declare that the following is a full, clear, and exact description thereof, reference being had to the accompanying drawings, and to the letters of reference marked thereon, which form a part of this specification.

This invention relates to improvements in shearing machines, and particularly to that class of shearing machines having a vibratory blade or cutter and a cutter guard, comb or toothed member, with respect to which the cutter is adapted to vibrate.

The principal object of the invention is to provide a simple, economical and efficient shearing machine.

A further object of the invention is to provide an improved means for securing and maintaining the vibratory cutter and cutter lever in operative position.

Other and further objects of the invention will appear from an examination of the following description and claims and from an inspection of the accompanying drawings which are made a part of this application.

The invention consists in the features, combinations, and details of construction herein described and claimed.

In the accompanying drawings, Figure 1 is a plan view of a shearing machine constructed in accordance with my invention and improvements; Fig. 2, a view in central vertical section, taken on line 2 of Fig. 1 looking in the direction of the arrow; Fig. 3, a top view in detail of my improved pivot-retaining upper bushing; and Fig. 4, a top or end view of the fixed pivot pin which forms the axis about which the cutter is adapted to vibrate.

In constructing a shearing machine in accordance with my invention and improvements, I provide a main casing or frame $a$ having a preferably flat forwardly projecting portion or flange $b$ adapted to form a suitable support for a cutter guard or comb member $c$ which is secured to the forwardly projecting portion or flange $b$ by means of screws $d$, or other suitable securing means, as shown in Fig. 2. A neck or shank portion $e$ of the casing or frame is adapted to serve as a handle and to form a support for suitable actuating mechanism. The actuating mechanism shown in the drawings is in the form of a crank shaft $f$ which is journaled or rotatably mounted in the axial opening in the shank and is adapted to be connected with a suitable source of power by means of a flexible shaft (not shown) or other suitable connecting means. The actuating shaft $f$ has a crank arm $g$ fixed to the forward end thereof and provided with a crank or wrist pin $h$ upon which is mounted a preferably spherical anti-friction member or ball $i$ having an axial opening $k$ therethrough, through which the pin $h$ extends.

The foregoing elements may be of any desired, ordinary, or well known construction adapted to enable a vibratory cutter and cutter lever to be actuated by means of the crank shaft $f$, or suitable actuating mechanism, and to be supported in an efficient manner in operative position with relation to the guard, toothed member, or comb, in connection with which the cutter is intended to operate.

The comb or guard $c$ shown in the drawings comprises a series of longitudinally projecting tapered teeth $l$ arranged in a transverse series or row and having their forwardly pointed or tapered end portions spaced apart and adapted to admit wool or material to be cut therebetween. Mounted in transverse sliding engagement with the toothed comb or guard is a vibratory or reciprocating cutter $m$, which is provided with forwardly projecting pointed or tapered cutter teeth or blades $n$ provided with spaces therebetween similar to the spaces between the teeth $l$ of the comb or guard. These cutter teeth are in superposed relation to the teeth of the comb or guard and in sliding engagement with the same, and each of the cutter teeth or blades $n$ has cutting edges on opposite sides thereof adapted to coact with the edges of the adjacent teeth $l$ of the comb or guard.

The cutter $m$ is supported upon the forward lever arm of a vibratory or reciprocating cutter-operating lever $o$, to which it may be secured in any well known or desired manner, as for instance by means of transverse arms $p$ and $q$ on the forward transverse swinging arm of the lever $o$ and screws or screw studs $r$ which extend through suitable perforations in the transverse arms $p$ and are in threaded engagement with the cutter *m* near the opposite ends of the cutter. These screws are, by preference, so connected with the arms *p* and with the cutter as to enable the latter to be adjusted with respect to said arms or the lever of which the arms form a part. Presser or clamping devices *s* comprising presser fingers *t* and stem portions *u* are rotatably mounted on the forwardly projecting arm of the reciprocatory lever *o* with the fingers *t* each normally in engagement with a blade *n* of the cutter—the stem portions *u* of the presser or clamping members being rotatably mounted in suitable apertures or socket portions *v* in the arms *p*, and each of the stems *u* having a threaded end portion *w* extending into a threaded perforation in the corresponding arm *q* of the lever *o*. The presser or lever members are thus adapted to be adjusted longitudinally with respect to the lever *o* and with respect to the blades *n* of the cutter. This may be done by first loosening the screws *r* and raising the fingers *t* out of engagement with the cutter and into position to permit the rotation of the presser members which are thus adapted to be turned in one direction to move them forward, and in an opposite direction to move them rearward or toward the bases of the cutter blades when the latter are made shorter by regrinding. The presser or clamping members *s* being rotatable are adapted not only to be adjusted so as to apply the pressure transmitted through the presser fingers at the proper points in the length of the cutter teeth, but are also adapted to adjust themselves by partial rotation so as to conform to any slight irregularity in the construction of the members *s* or the cutter engaged thereby, so as to equalize the pressure upon the cutter or cause the pressure transmitted to the cutter by the respective fingers *t* to be properly distributed and applied.

The cutter-supporting and actuating lever *o* is provided with a rearwardly extending lever arm *y* having a vertically elongated partially cylindrical slot 2 in the rear end thereof between vertically elongated jaws 3, the inner surfaces of which jaws are sufficiently convex and arranged at such a distance from each other as to admit and fit against the curved or spherical surface of the anti-friction member or ball *i*, already described. The wrist or crank pin *h* and its antifriction member or ball *i* are thus permitted to move freely within the groove or socket thus formed by or between the jaws 3 when the crank shaft and wrist pin or crank *h* are rotated in order to actuate the cutter lever *o* and thereby the cutter.

The cutter lever *o* is provided with a vertical opening 4 therethrough in which is mounted a sleeve 5 having a central lever-engaging annular peripheral shoulder or bearing portion 6 forming an upwardly and outwardly curved convex or parti-spherical bearing surface which is seated in sliding engagement with a similarly curved inner concave face of an annular seat 6′ on the lever *o*. The seat 6′ encircles the sleeve beneath and in bearing engagement with the shoulder or bearing 6, and the latter is thus adapted to hold the lever *o* in any adjusted operative position and prevent all undesirable play between the sleeve and cutter lever. The bearing shoulder 6 and seat 6′ are adapted to permit the lever *o* to adjust itself with respect to the sleeve and pivot so that the pressure upon the cutter may be equalized and kept uniform and efficiently regulated and adjusted as herein set forth.

The sleeve 5 is provided with peripheral shoulder portions 7 and 8 which project laterally beyond the periphery of the main body of the sleeve out of engagement with the top side of the lever *o*, the shoulder 8 being in engagement with an upwardly projecting transverse shoulder 9 on the lever *o*. The construction and arrangement of the shoulders 8 and 9 are such as to cause the sleeve to be maintained in such relation to the cutter-operating lever *o* as to rotate or oscillate with the latter. The upper end of the sleeve 5 is journaled in a bushing 10 having a vertical axial perforation therethrough, which bushing is mounted, by preference, in threaded engagement with the upper portion of the main casing or frame *a*, and has a shouldered flange 11 in engagement with the casing and adapted to enable the bushing to be turned by means of a wrench in the operation of assembling or adjusting the parts. The lower end of the sleeve 5 is rotatably mounted in a bushing 12 which is also mounted in threaded engagement with the main casing *a*, and provided with a suitable vertical aperture into which the sleeve 5 extends. The upper end of the sleeve 5 is provided with an endwise projecting annular bearing portion 13 of relatively small diameter, and a pivot pin 14 extends through the sleeve 5 and is provided at its upper end with a shouldered or transversely elongated head 15 which extends between upwardly projecting shoulders or flanges 16 on the bushing 10, so as to be securely held against rotation by the bushing when the parts are in operative position.

The head 15 of the pivot pin has an annular neck or thrust bearing portion 17 adapted to engage the similar end bearing or thrust bearing portion 13 of the sleeve 5 so as to receive the end thrust or the endwise pressure transmitted by the sleeve in the operation of the cutter.

The pin 14 is provided with a threaded projecting bottom end portion 18 upon and in threaded engagement with which is mounted a thumb nut 19 which is adapted to be held tightly in engagement with the bottom face of the bushing 12 when the nut is tightened. A compressible spring 20 is interposed between the bottom of the cutter-operating lever o and the bottom inner wall 21 of the main frame or casing a in position to encircle the sleeve 5. The upper end portion of the spring is held in proper position by an annular bottom shoulder 22 on the lever, so that the spring is in position to form a yielding support for the lever o adapted to hold the latter yieldingly in engagement with the annular shoulder 6 of the sleeve 5 and thereby yieldingly hold the upper end bearing portion 13 of the sleeve 5 yieldingly in engagement with the annular bearing portion 17 on the head of the pivot pin 14.

The pivot pin 14 is rigidly held in position, or prevented from turning, by means of the slotted or shouldered bushing 10, the shoulders or bosses 16 of which engage the upper end or head of the pin. By turning the nut 19 at the bottom end of the pin and in engagement with the bushing 12 in one direction, the lever o is drawn downward against the tension of the spring 20 so that the cutter is held in sufficiently tight engagement with the guard or comb to cut in an efficient manner material to be operated upon. By loosening the thumb nut 19, the cutter is rendered more freely movable on the comb, and is caused to engage the comb or guard more lightly. The portion of the sleeve between the annular shoulder 6 and the bottom end of the sleeve is of such length as to leave a space 23 between the bottom end of the sleeve and the nut 19, which permits the adjustment of the lever o and cutter, by turning the thumb nut, as above suggested. The sleeve 5 is thus held in non-rotatable relation to the vibratory or oscillating cutter-operating lever o and is yieldingly held in engagement with the fixed portion 17 of the fixed adjustable pivot pin 14, by means of which the cutter lever o—and thereby the cutter—is adjusted and pivotally supported, as already described.

It will thus be seen that the portion of the pivot pin 14 against which the sleeve 5 bears is securely held against rotation by means of the upwardly projecting shoulders or flange portions 16 of the bushing 10, in such a manner that the tendency to loosen the pivot pin, due to the rapid oscillation of the vibratory members and particularly the vibration of the cutter-operating lever o, is entirely eliminated. The thumb nut is entirely out of engagement with all moving or vibratory parts and therefore adapted to be securely held against accidental rotation and prevented from becoming loosened by the vibratory or moving parts or other causes, and the cutter is thus held in operative position and is adapted to be adjusted by means which will at all times prevent the cutter from becoming loose, but which will permit it to be adjusted with facility, and at all times held in such a manner as to operate with a high degree of efficiency. In short the means for adjusting the cutter lever and cutter and which come into actual contact with any vibratory or moving part are securely locked against rotation by the engagement of the head of the pivot pin with the shoulders 16 of the bushing 10, and the movable adjusting member or nut is entirely out of engagement with all vibratory or moving parts and thus prevented from being loosened or rotated by the vibrations or movements of the moving parts.

A threaded cap 24 is mounted in threaded engagement with the upwardly projecting, outwardly threaded shoulder or flange portions 16 of the bushing, and is thus adapted to prevent any foreign substances from being admitted into contact with the parts inclosed by such cap and to prevent the accidental removal of the pivot pin 14.

The structural details of the invention herein shown may be varied within the spirit of my invention, and I do not limit the invention to the illustrated details except as hereinafter made the subject of specific claims.

I claim:

1. In a shearing machine, the combination of a cutter, a guard adjacent to the cutter, a cutter-actuating lever operatively connected with the cutter, a pivot post extending through said lever, securing means in operative engagement with the upper end of said pivot post, for preventing the rotation thereof, and an adjusting nut mounted beneath the oscillating lever and in engagement with a rigid part of said machine and in threaded engagement with the bottom end of said pivot post and out of engagement with all moving parts of the machine.

2. In a shearing machine, the combination of a cutter, a guard adjacent to the cutter, an oscillating cutter-actuating lever operatively connected with the cutter, a pivot post extending through said lever and provided with a head at its upper end, means in engagement with the head of the pivot post, for preventing the rotation of the post, an oscillating sleeve interposed between said post and the cutter-operating lever and provided with an annular downwardly and outwardly facing bearing in engagement with said lever, and means for adjusting the non-rotative pivot post longitudinally.

3. In a shearing machine, the combination of a cutter, an oscillating cutter-actuating lever operatively connected with the cutter, a pivot post extending through said lever and provided with a head, means in engagement with the head of the pivot post, for preventing the rotation of the post, a sleeve interposed between said post and the cutter-operating lever and provided with an annular downwardly facing convex bearing in engagement with said lever, said sleeve having a transverse surface portion in engagement with the lever above the level of said annular bearing.

4. In a shearing machine, the combination of a cutter, a guard adjacent to the cutter, a cutter-actuating lever operatively connected with said cutter, a pivot post extending through said lever, means in engagement with one end of said post for preventing rotation thereof, and an adjusting nut in engagement with the other end of said post and bearing against a rigid part of the machine frame.

In testimony, that I claim the foregoing as my invention I affix my signature in the presence of two witnesses, this 18th day of October, A. D. 1913.

ENOCH A. PALMER.

Witnesses:
EUGENE C. WANN,
HARRY IRWIN CROMER.

---

Copies of this patent may be obtained for five cents each, by addressing the "Commissioner of Patents, Washington, D. C."